No. 608,696. Patented Aug. 9, 1898.
W. C. MATTESON.
GANG PLOW.
(Application filed Feb. 15, 1898.)
(No Model.) 2 Sheets—Sheet 2.
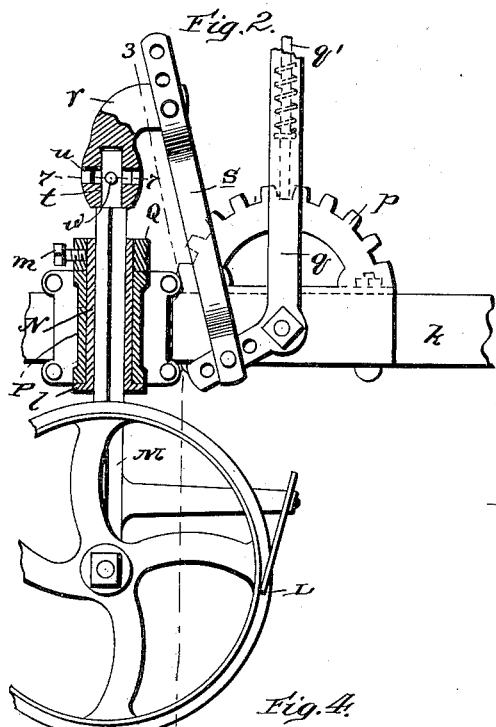
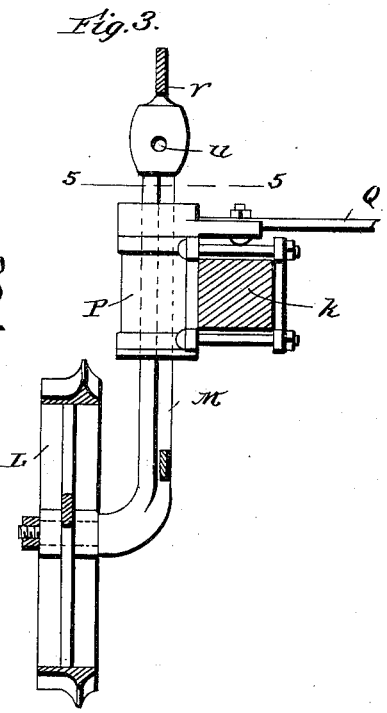
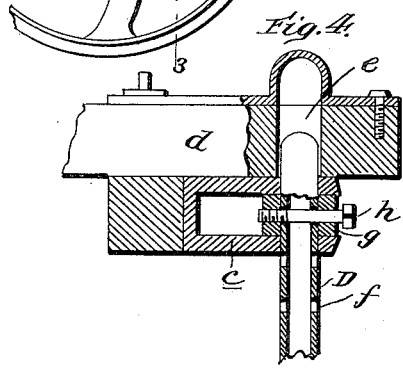
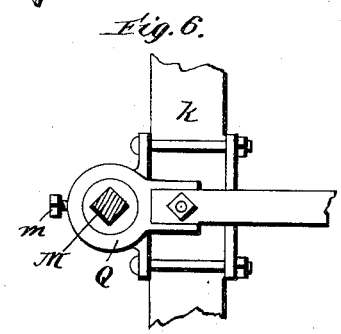
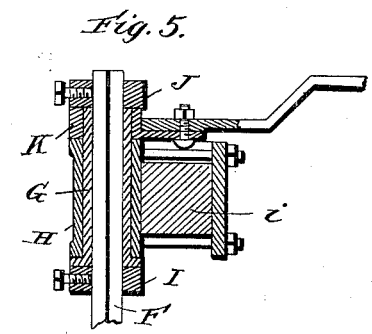
Witnesses:
Inventor
W. C. Matteson
By James Sheehy
Attorney

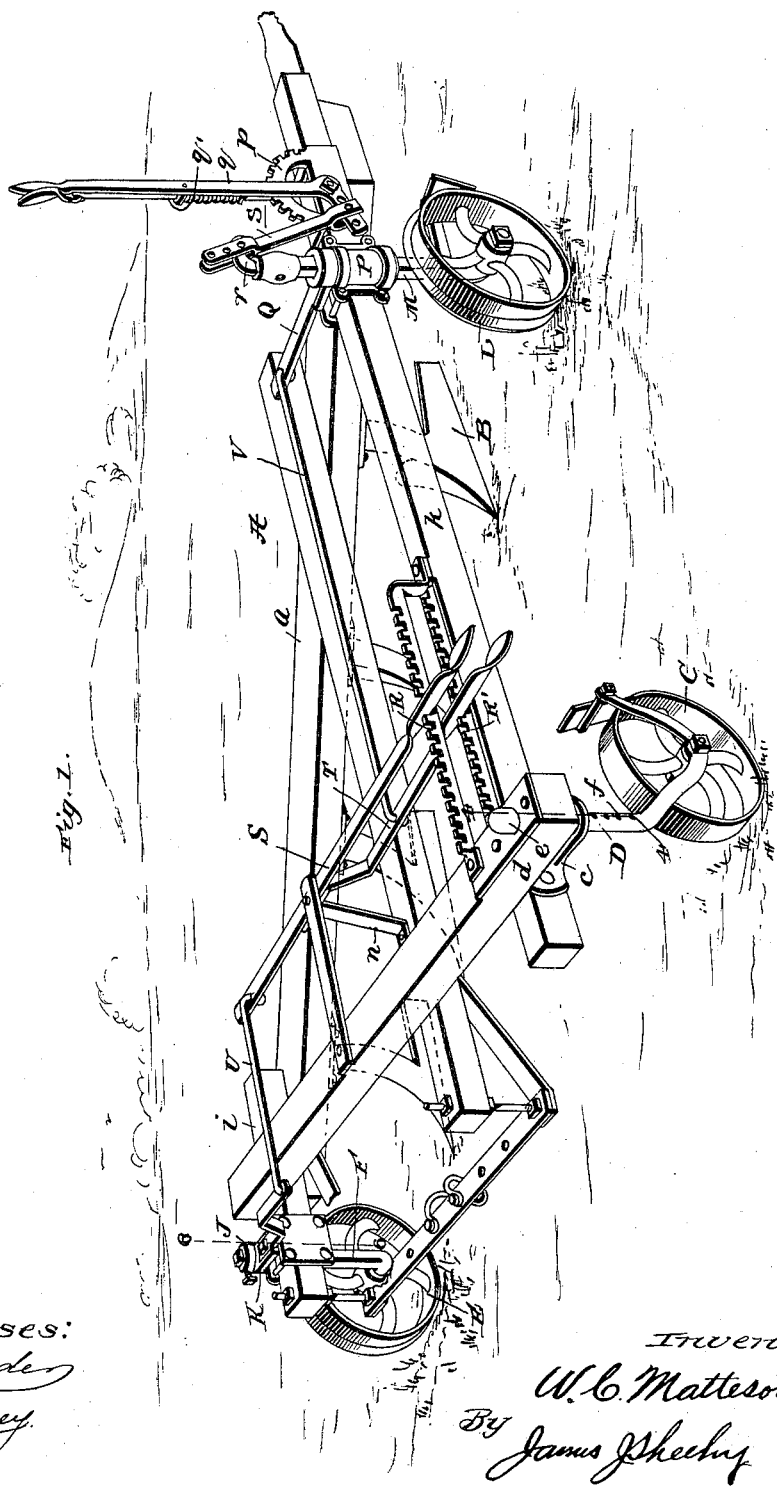

UNITED STATES PATENT OFFICE.

WALTER C. MATTESON, OF STOCKTON, CALIFORNIA.

GANG-PLOW.

SPECIFICATION forming part of Letters Patent No. 608,696, dated August 9, 1898.

Application filed February 15, 1898. Serial No. 670,396. (No model.)

*To all whom it may concern:*

Be it known that I, WALTER C. MATTESON, a citizen of the United States, residing at Stockton, in the county of San Joaquin and State of California, have invented new and useful Improvements in Gang-Plows, of which the following is a specification.

My invention relates to gang-plows, and has for one of its objects to provide a gang-plow embodying means whereby an attendant walking at one side of the plow, where he is in no danger of being run over, is enabled to quickly and easily change the course of the plow.

Another object is to provide a gang-plow embodying means whereby the main frame may be quickly and easily adjusted and adjustably fixed on the hanger of the rear guide-wheel so as to gage the depth of the furrows made by the plows or hold said plows above the ground, and this without interfering with the swinging movements of said wheel necessary to change the course of the plow.

Other objects and advantages of the invention will be fully understood from the following description and claims when taken in conjunction with the annexed drawings, in which—

Figure 1 is a perspective view of my improved gang-plow. Fig. 2 is a detail side elevation, on an enlarged scale, with some parts in section and others partly broken away, illustrating the rear guide and gage wheel and the means for adjusting and adjustably fixing the frame on the hanger thereof. Fig. 3 is a section taken on the line 3 3 of Fig. 2. Figs. 4 and 5 are detail sections taken in the planes indicated by the lines 4 4 and 6 6, respectively, of Fig. 1. Fig. 6 is a detail section taken in the plane indicated by the line 5 5 of Fig. 3, and Fig. 7 is a detail section taken in the plane indicated by the line 7 7 of Fig. 2.

In the said drawings similar letters designate corresponding parts in all of the several views, referring to which—

A designates the main frame of my improved gang-plow, which may be of any suitable construction, although that shown in Fig. 1 is preferred.

B designates a plurality of plows connected to a bar $a$ of the main frame, and C designates one of the forward traveling wheels which is carried by a hanger D, as illustrated. The said hanger D extends loosely through a casting $c$ at the under side of the forward frame-bar $d$ and into a socket $e$, formed in said bar, and it is provided with a plurality of apertures $f$ at intervals in its length, so as to permit of a collar $g$ being adjustably fixed upon it by a removable pin $h$, as better shown in Fig. 4. The collar $g$ is interposed between the upper and lower arms of the casting $c$, and from this it follows that while the hanger is free to turn and the wheel C to swing the frame may be readily adjusted and adjustably fixed on said hanger so as to rest at various elevations.

E designates the forward guide-wheel of the plow, which is carried by a hanger F. (Better illustrated in Figs. 5 and 6.) This hanger F is of an angular form in cross-section and extends through and is designed to turn with a sleeve G, which is journaled in a bearing H, clipped or otherwise connected to a bar $i$ at the opposite side of the frame with respect to the wheel C, as illustrated. The sleeve G is flanged at its lower end to form a rest for the bearing H, and it bears in turn upon a collar I, which is adjustably fixed upon the hanger by a set-screw $j$ or other suitable means. In virtue of this construction it will be observed that both hanger F and sleeve G are free to turn in the bearing H and that the sleeve, and consequently the main frame A, may be raised and lowered upon the hanger and adjustably fixed at various elevations. A collar J is adjustable fixed by a set-screw upon the hanger above sleeve G, and between this collar and the upper end of the bearing H is arranged a crank K, which is fixed on the sleeve G and is designed for a purpose presently described.

L designates the rear guide-wheel of the plow, which is designed to serve the additional function of a gage-wheel, as will be presently described. This wheel L is carried by a hanger M, and the said hanger, which is of angular form in cross-section, extends through a sleeve N, the bore of which is also of angular form in cross-section, whereby it will be seen that while the hanger and sleeve will turn together the sleeve is free to move in an endwise direction on said hanger. The said sleeve N is journaled in a bearing P, clipped or otherwise connected to a bar $k$ of the main frame, and it is provided at its lower end with a flange $l$, which engages the lower end of the bearing P, while upon its upper end is fixed, by a set-screw $m$ or other suitable means, a crank Q, which bears on the upper end of the bearing P and serves, in conjunction with the flange $l$, to hold the sleeve against endwise movement with respect to said bearing.

R R' designate rack-bars which are arranged one above the other on the main frame A, adjacent to one side thereof.

S T designate hand-levers which are fulcrumed at the same point on a suitable support $n$, connected to the frame, and are so arranged that they are adapted to engage and be held by the racks R R', respectively.

U designates a link which is interposed between and connects the lever S and the crank K, and V designates a link which connects the lever T and the crank Q.

The levers S T are preferably formed of resilient metal, so as to permit of them being readily disengaged from their respective racks, and are fulcrumed at a common point. Consequently the operator is enabled with one hand to move them both at the same time, and thereby simultaneously swing the wheels E L in one direction. When the plow is in motion and the said wheels E L are simultaneously swung in one direction, as just stated, it will result in the plow being quickly turned in such direction, which is an important advantage. While the levers S T are adapted to be moved in concert to effect a quick turning of the plow, yet they may be moved independent of each other, as may also the wheels E L, with which they are respectively connected.

In Figs. 1, 2, and 3 of the drawings is illustrated the mechanism for adjusting and adjustably fixing the main frame A on the hanger M of the wheel L so as to gage the depth of the furrows formed by the plows B and also to hold the said plows above the ground when it is desired to move the plow from place to place. This mechanism by preference comprises a segmental rack $p$, mounted on the frame-bar $k$, a lever $q$, fulcrumed on said frame-bar and having a suitable detent $q'$, adapted to engage the rack $p$, a head $r$ on the upper end of the hanger M, and a link $s$, connecting the lever $q$ and the head $r$, said link being preferably connected to both lever and head, as shown. In virtue of this construction it will be seen that when the lever $q$ is swung in the direction indicated by arrow in Fig. 2 the frame A will be moved downwardly on the hanger M, while when said lever is swung in the opposite direction the frame will be moved upwardly on the hanger. It will also be seen that when the detent $q'$ is in engagement with the rack $p$ the frame will be adjustably fixed on the hanger M.

In order to prevent the vertical adjustment of the frame A on hanger M from interfering with the rocking movements of said hanger necessary to swing the wheel L in one direction or the other, the head $r$ is connected with the upper end of the hanger in a swiveled manner. This swivel connection may be effected in any suitable manner, although that shown in Figs. 2, 3, and 7 is preferred. In making this connection the head $r$ is provided with a bore $t$ and also with diametrically opposite apertures $u$ and an interior groove $v$, coincident with said apertures, while the hanger M is provided with a loose pin $w$. In assembling these parts the upper reduced end of the hanger M is placed in the bore of the head, and the loose pin $w$ is passed through one of the apertures $u$ of the head and the aperture of the hanger, after which a quarter-turn of the hanger is made, so as to cause said pin to assume the position shown in Fig. 7, with its ends resting in the groove $v$. With this done it will be perceived that a strong and durable connection of the head $r$ to the hanger M is effected, and one which admits of the hanger turning freely in the head for the purpose before described.

Having thus described my invention, what I claim is—

1. In a gang-plow, the combination of a main frame, hangers journaled in said frame and provided with cranks, guide-wheels carried by said hangers, hand-levers fulcrumed at a common point on the main frame, a connection between one lever and the crank of one hanger, a connection between the other lever and the crank of the other hanger, and suitable means for normally holding said levers against casual movement, substantially as specified.

2. In a gang-plow, the combination of a main frame, a front guide-wheel, a hanger carrying said front guide-wheel and journaled in the frame and provided with a crank, a sleeve journaled in the main frame and provided with a crank, a rear guide-wheel, a hanger carrying said rear guide-wheel and keyed on the sleeve whereby said sleeve is enabled to turn with the hanger and move up and down on the same, a head connected in a swiveled manner with the hanger, suitable mechanism, for adjustably fixing the main frame at various elevations on the hanger, connected with said head, hand-levers fulcrumed at a common point on the main frame, a connection between one lever and the crank of the hanger carrying the front guide-wheel, a connection between the other lever and the crank of the hanger carrying the rear guide-wheel, a suitable means for normally holding said levers against casual movement, substantially as specified.

3. In a gang-plow, the combination of a main frame, a sleeve journaled in said frame and provided with a crank, a wheel, a hanger carrying said wheel and keyed in the sleeve whereby said sleeve is enabled to turn with the hanger and move up and down on the same, a hand-lever fulcrumed on the main frame and connected with the crank of the sleeve and hanger, a head connected in a swiveled manner with the hanger, suitable mechanism, for adjustably fixing the main frame at various elevations on the hanger, connected with said head, substantially as specified.

4. In a gang-plow, the combination of a main frame, a sleeve journaled in said frame and provided with a crank, a wheel, a hanger carrying said wheel and keyed in the sleeve whereby said sleeve is enabled to turn with the hanger and move up and down on the same, a hand-lever fulcrumed on the main frame and connected with the crank of the sleeve and hanger, a head connected in a swiveled manner with the hanger, a segmental rack fixed on the frame, an upright lever having a detent adapted to engage said rack, and a link connecting the lower end of said lever and the head on the hanger, substantially as specified.

In testimony whereof I have hereunto set my hand in presence of two subscribing witnesses.

WALTER C. MATTESON.

Witnesses:
E. J. MATTESON,
L. M. CUTTING.